US012607132B1

(12) United States Patent
Nasr et al.

(10) Patent No.: US 12,607,132 B1
(45) Date of Patent: Apr. 21, 2026

(54) HEAT EXCHANGER ASSEMBLY CONFIGURATION FOR A GAS TURBINE ENGINE

(71) Applicant: General Electric Company, Evendale, OH (US)

(72) Inventors: Hojjat Nasr, West Chester, OH (US); Michael Vadnais, Delafield, WI (US); Jeffrey Douglas Rambo, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/055,072

(22) Filed: Feb. 17, 2025

(51) Int. Cl.
*F01D 25/12* (2006.01)
*F01D 25/24* (2006.01)

(52) U.S. Cl.
CPC .............. *F01D 25/12* (2013.01); *F01D 25/24* (2013.01); *F05D 2260/20* (2013.01)

(58) Field of Classification Search
CPC ................................. F01D 25/12; F01D 25/24
See application file for complete search history.

(56) References Cited

U.S. PATENT DOCUMENTS 6,374,612 B1 4/2002 Gladden et al.
6,764,279 B2 7/2004 Meshenky
7,142,424 B2 11/2006 Malone et al.
7,337,831 B2 3/2008 Torii
8,132,408 B2 3/2012 Li et al.
8,387,362 B2 * 3/2013 Storage .................. F02K 3/115 60/266
8,616,834 B2 12/2013 Knight, III et al.
9,394,828 B2 7/2016 Eleftheriou et al.
9,766,019 B2 9/2017 Eleftheriou et al.
11,078,795 B2 8/2021 Jonnalagadda et al.
11,262,144 B2 3/2022 Breeze-Stringfellow et al.
11,873,758 B1 1/2024 Durocher et al.
2014/0044525 A1 * 2/2014 Storage .................. F28F 1/022 29/888.012
2023/0151824 A1 5/2023 Sishtla et al.

* cited by examiner

*Primary Examiner* — Sabbir Hasan
(74) *Attorney, Agent, or Firm* — Dority & Manning, P.A.

(57) ABSTRACT

A gas turbine engine defines a radial direction and an axial direction. The gas turbine engine includes an inlet duct comprising a splitter, a fan duct downstream from the inlet duct and the splitter, and a core duct downstream of the inlet duct and the splitter. The core duct may be radially inward of the fan duct. A heat exchanger assembly may extend annularly about at least one of the inlet duct, the fan duct, or the core duct. The heat exchanger assembly may include a sheet extending circumferentially about the at least one of the inlet duct, the fan duct, and the core duct. One or more aerodynamic features extend from the sheet, the one or more aerodynamic features within the at least one of the inlet duct, the fan duct, and the core duct.

11 Claims, 9 Drawing Sheets

HEAT EXCHANGER ASSEMBLY CONFIGURATION FOR A GAS TURBINE ENGINE

FIELD

The present disclosure relates to a gas turbine engine.

BACKGROUND

A gas turbine engine generally includes a turbomachine and a rotor assembly. For at least some gas turbine engines, the turbomachine may include a heat exchanger assembly.

BRIEF DESCRIPTION OF THE DRAWINGS

A full and enabling disclosure of the present disclosure directed to one of ordinary skill in the art, is set forth in the specification, which makes reference to the appended figures, in which.

DETAILED DESCRIPTION

Figure 1:
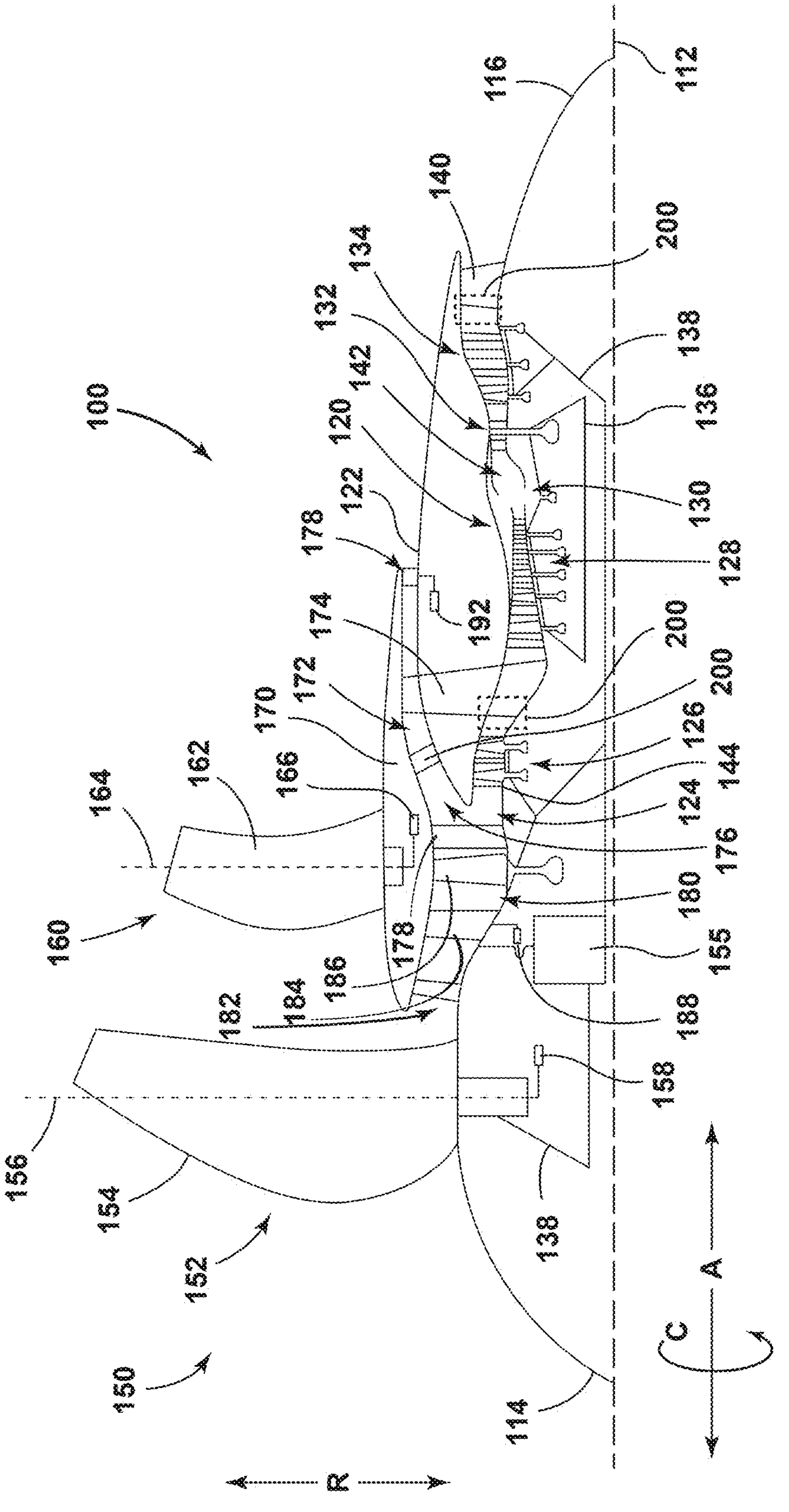
FIG. 1 is a cross-sectional view of a gas turbine engine in accordance with various aspects of the present disclosure.
Figure 2:
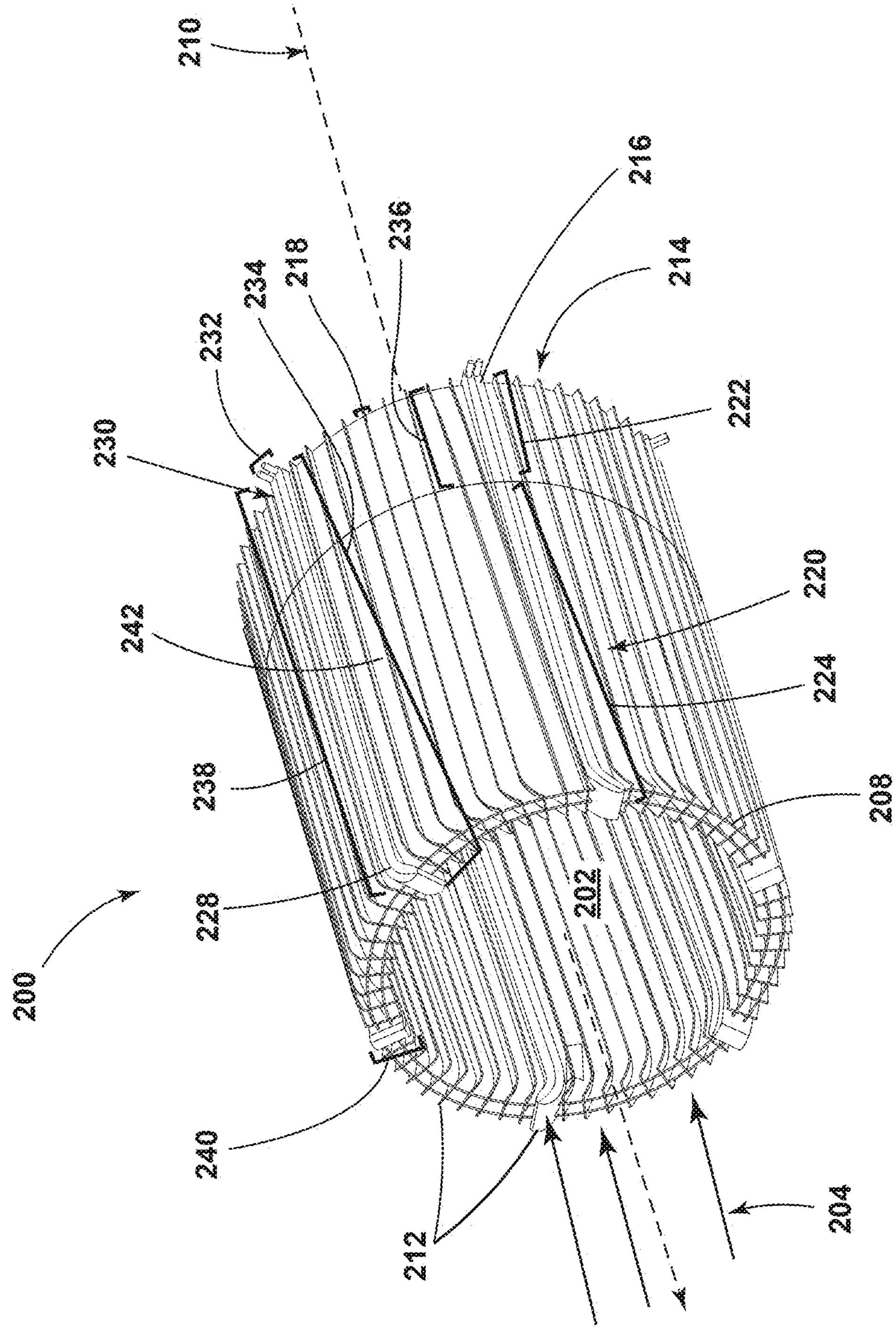
FIG. 2 is a perspective view of a heat exchanger assembly in accordance with various aspects of the present disclosure.
Figure 3:
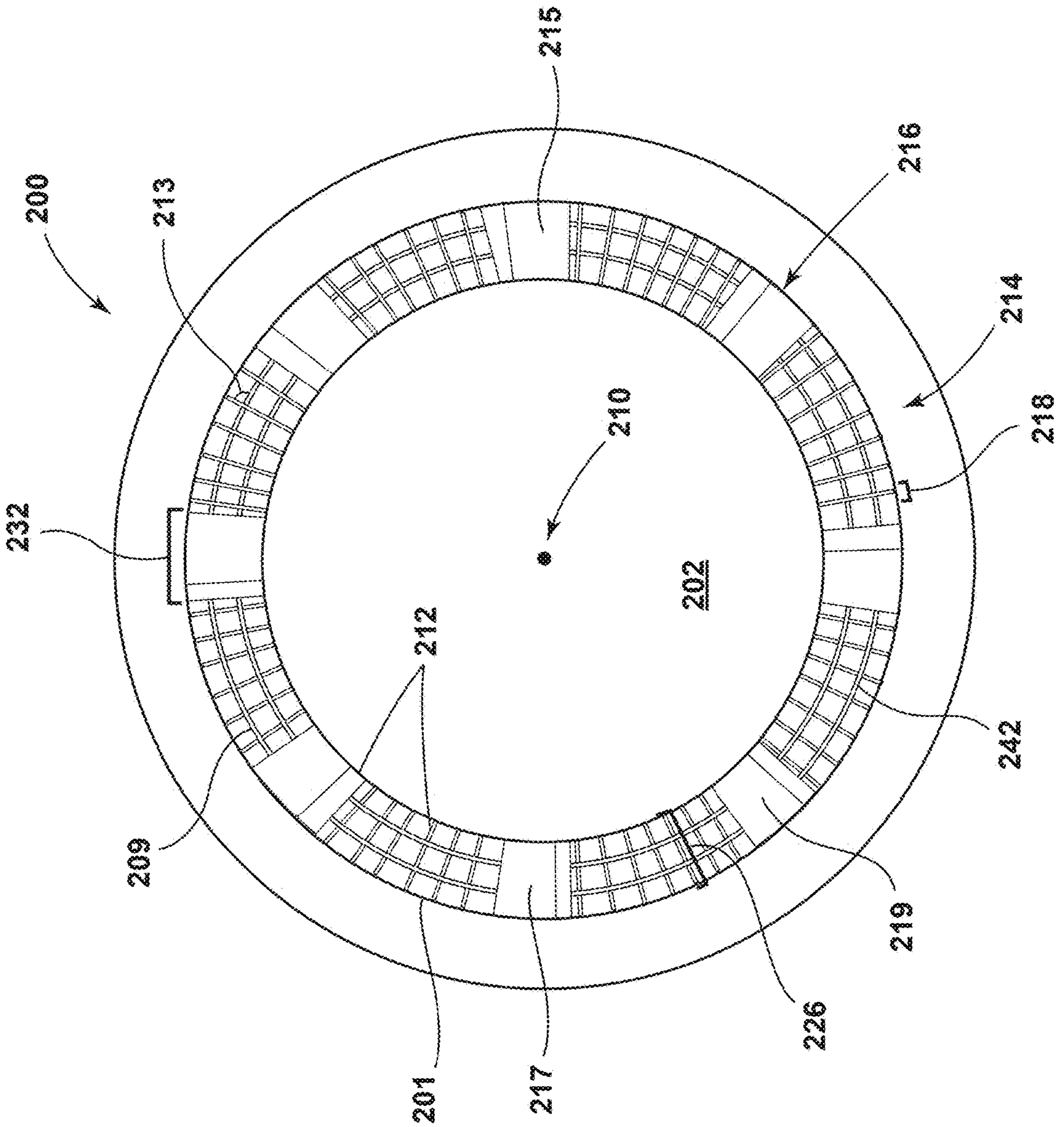
FIG. 3 is a front view of the heat exchanger assembly in accordance with various aspects of the present disclosure.
Figure 4:
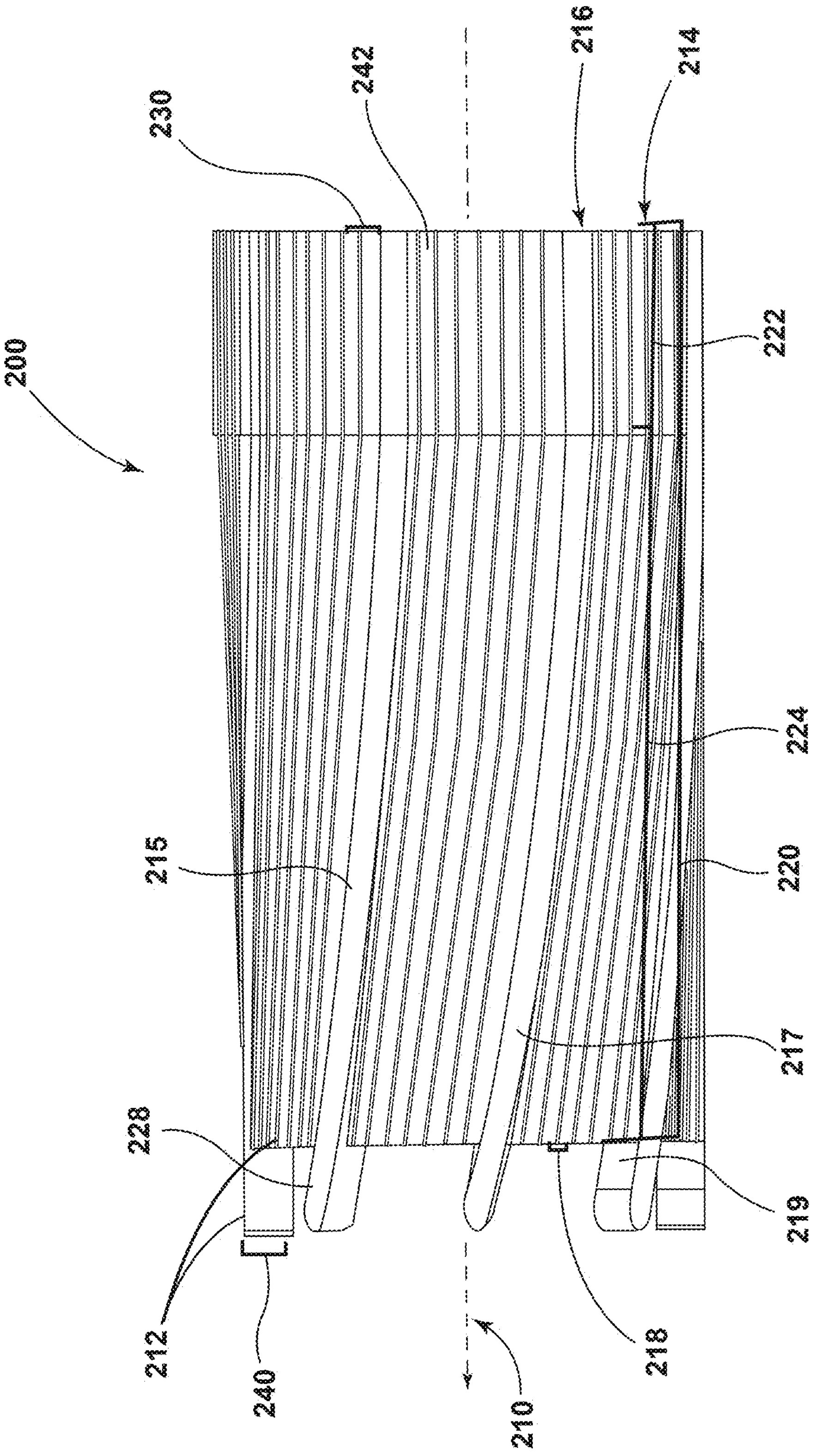
FIG. 4 is a side view of the heat exchanger assembly in accordance with various aspects of the present disclosure.
Figure 5:
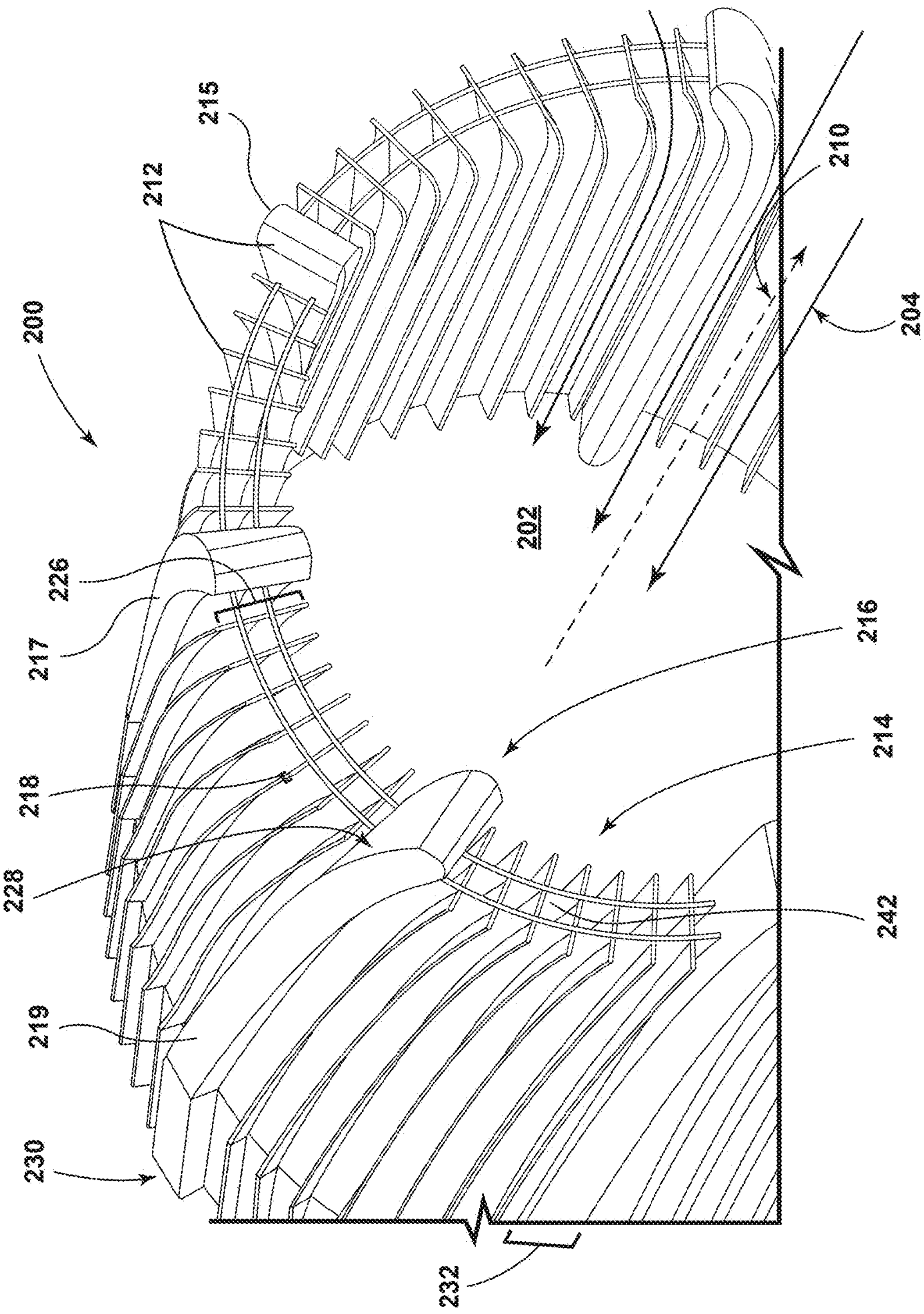
FIG. 5 is a close-up perspective view of the heat exchanger assembly in accordance with various aspects of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

As used herein, the terms "first," "second," and "third" may be used interchangeably to distinguish one component from another and are not intended to signify the location or importance of the individual components. The singular forms "a", "an", and "the" include plural references unless the context clearly dictates otherwise. Furthermore, as used herein, the term "set" or a "set" of elements may be any number of elements, including only one.

Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The drawings are for purposes of illustration only and the dimensions, positions, order, and relative sizes reflected in the drawings attached hereto can vary.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein.

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

The term "unitary" as used herein denotes that the final component has a construction in which the integrated portions are inseparable and is different from a component comprising a plurality of separate component pieces that have been joined together but remain distinct and the single component is not inseparable (e.g., the pieces may be re-separated). Thus, unitary components may comprise generally substantially continuous pieces of material or may comprise a plurality of portions that are permanently bonded to one another. In any event, the various portions forming a unitary component are integrated with one another such that the unitary component is a single piece with inseparable portions.

As used herein, the term "composite material" refers to a material produced from two or more constituent materials. A "composite material" refers to at least one of the constituent materials is a non-metallic material. Example composite materials include polymer matrix composites (PMC), ceramic matrix composites (CMC), chopped fiver composite materials, etc.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (e.g., a first wall/surface contacting the one or more nonstructural layers, and the one or more nonstructural layers contacting a second wall/surface).

The phrases "from X to Y" and "between X and Y" each refer to a range of values inclusive of the endpoints (e.g., refers to a range of values that includes both X and Y).

The term "turbomachine" refers to a machine including one or more compressors, a heat-generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and are based on a normal operational attitude of the gas turbine engine or vehicle. More particularly, forward and aft are used herein with reference to a direction of travel of the vehicle and a direction of propulsive thrust of the gas turbine engine.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. For example, when used in terms of fluid flow, fore/forward can mean upstream, and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

Furthermore, any arrangement of components to achieve the same functionality is effectively "associated" such that the functionality is achieved. Hence, any two components herein combined to achieve a particular functionality may be seen as "associated with" each other such that the defined functionality is achieved, irrespective of architectures or intermedial components. Likewise, any two components so associated can also be viewed as being "operably connected" or "operably coupled" to each other to achieve the defined functionality, and any two components capable of being so associated can also be viewed as being "operably couplable" to each other to achieve the defined functionality. Some examples of operably couplable include, but are not limited to, physically mateable, physically interacting components, wirelessly interactable, wirelessly interacting components, logically interacting, and/or logically interactable components.

As used herein, the term "fluid" as used herein may be a gas or a liquid. The term "fluid communication" means that a fluid is capable of making the connection between the areas specified.

As used herein, the term "about" describes a circular path around a central point and/or axis. For example, an object may be described as "rotating about its center" when it spins clockwise and/or counterclockwise around its center.

A "third stream" as used herein means a non-primary air stream capable of increasing fluid energy to produce a minority of total propulsion system thrust. The third stream may generally receive inlet air (air from a ducted passage downstream of a primary fan) instead of freestream air (as the primary fan would). A pressure ratio of the third stream may be higher than that of the primary propulsion stream (e.g., a bypass or propeller driven propulsion stream). The thrust may be produced through a dedicated nozzle or mixing of an airflow through the third stream with a primary propulsion stream or a core air stream, e.g., into a common nozzle.

In certain embodiments, an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain embodiments, these operating temperatures may facilitate heat transfer to or from the airflow through the third stream and a separate fluid stream. Further, in certain embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions. Furthermore in certain embodiments, aspects of the airflow through the third stream (e.g., airstream, mixing, or exhaust properties), and thereby the aforementioned percent contribution to total thrust, may passively adjust during engine operation or be modified purposefully through the use of engine control features (such as fuel flow, electric machine power, variable stators, variable inlet guide vanes, valves, variable exhaust geometry, or fluidic features) to adjust or optimize overall system performance across a broad range of potential operating conditions.

Approximating language, as used herein throughout the specification and claims, is applied to modify any quantitative representation that could permissibly vary without resulting in a change in the basic function to which it is related. Accordingly, a value modified by a term or terms, such as "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

The present disclosure may generally relate to a gas turbine engine and a heat exchanger assembly. Generally, the gas turbine engine may include a deswirling feature (e.g. an outlet guide vane arrangement) at a mid-fan location and/or a low pressure turbine location upstream of the heat exchanger assembly. The heat exchanger assembly may be used to exchange thermal energy between various fluids within the gas turbine engine to be utilized in the operation of various components. The deswirling feature may typically deswirl the flow upstream of the heat exchanger assembly. That is, the deswirling feature may remove a circumferential component of a flow velocity vector of the flow upstream of the heat exchanger assembly. However, this arrangement may introduce unwanted pressure drops across the heat exchanger assembly that impact engine performance. As such, the heat exchanger assembly and/or structural frame struts may include a deswirling mechanism arranged to create a more axially-aligned flow through the heat exchanger and surrounding engine duct without the inclusion of the deswirling feature for the functionality of the heat exchanger assembly. For instance, the heat exchanger assembly may include one or more aerodynamic features extending into at least one of the inlet duct, the fan duct, and/or the core duct to increase the efficiency of the heat exchanger assembly while simultaneously adjusting and/or eliminating the circumferential component of the flow velocity vector of the fluid flow. In this way, the pressure drop across the heat exchanger assembly may be mitigated, thus contributing to improved engine performance. Further, the axial length of the heat exchanger assembly may be reduced due to the mitigation of the pressure drop, providing benefits for packaging.

Referring now to FIG. 1, a schematic cross-sectional view of a gas turbine engine 100 is provided. Particularly, FIG. 1 provides a turbofan engine having a rotor assembly with a single stage of unducted rotor blades. In such a manner, the rotor assembly may be referred to herein as an "unducted fan," or the entire engine 100 may be referred to as an "unducted turbofan engine." In addition, the engine 100 of FIG. 1 includes a third stream extending from the compressor section to a rotor assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to as a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 may be coaxial with the HP shaft 136. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in the illustrated example. For the example depicted in FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the example shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Each fan blade 154 defines a central blade axis 156. In the illustrated example, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. In the illustrated example, the fan guide vanes 162 are not rotatable about the longitudinal axis 112. Each fan guide vane 162 has a root and a tip. A span is defined between the root and the tip. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. In the illustrated example, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, each fan guide vane 162 may be fixed or unable to be pitched about its central blade axis 164. The fan guide vanes 162 are mounted to the fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the illustrated example). The ducted fan 184 is rotatable about the same axis (e.g., the longitudinal axis 112) as the fan blade 154. The ducted fan 184 may be driven by the low pressure turbine 134 (e.g. coupled to the LP shaft 138). As noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip. A span is defined between the root and the tip.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. In the illustrated example, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected and supported by a plurality of substantially radially extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122 In the illustrated example, the inlet duct 180 is wider than the core duct 142 along the radial direction R. The inlet duct 180 is also wider than the fan duct 172 along the radial direction R.

Notably, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 is arranged around the longitudinal axis 112. As illustrated, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, each inlet guide vanes 186 may be fixed or unable to be pitched about its central blade axis.

Further, the fan exhaust nozzle 178 of the fan duct 172 may further be configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184 and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in some instances, air passing through the fan duct 172 may be relatively cooler (e.g., lower temperature) than one or more fluids utilized in the turbomachine 120. In this way, one or more heat exchanger assemblies 200 may be positioned in thermal communication with the fan duct 172. For example, one or more heat exchanger assemblies 200 may be disposed within the fan duct 172 and utilized to cool one or more fluids from the engine 100 with the air passing through the fan duct 172, as a resource for removing heat from a fluid, e.g., compressor bleed air, oil, fuel, and/or any other fluid.

The heat exchanger assembly 200 may be an annular heat exchanger assembly extending substantially 360 degrees in the fan duct 172 (e.g., at least 300 degrees, such as at least 330 degrees). In such a manner, the heat exchanger assembly 200 may effectively utilize the air passing through the fan duct 172 to cool one or more systems of the engine 100 (e.g., lubrication oil systems, compressor bleed air, electrical components, etc.). The heat exchanger assembly 200 may use the air passing through the fan duct 172 as a heat sink and may correspondingly increase the temperature of the air downstream of the heat exchanger assembly 200 and exiting the fan exhaust nozzle 178.

The heat exchanger assembly 200 may be an air cooled oil cooler (ACOC), a waste heat recovery heat exchanger, or any other heat exchanger assembly that may be suitable for the configuration of the gas turbine engine 100. Moreover, the heat exchanger assembly 200 may be arranged within the gas turbine engine 100, such as within (e.g., annularly about) any suitable duct to perform any suitable heat transfer.

Referring now to FIGS. 2-5, several views of the heat exchanger assembly 200 in accordance with various aspects of the present disclosure are depicted. As noted above, the heat exchanger assembly 200 may extend annularly about an engine duct 202. For example, the heat exchanger assembly 200 may extend annularly about a centerline for any suitable engine duct 202, which may be arranged as an inlet duct 180 (FIG. 1), a fan duct 172 (FIG. 1), a core duct 142 (FIG. 1), or any other duct. The heat exchanger assembly 200 may extend annularly about the centerline 210 of the engine duct 202 along the inner surface of the engine duct 202.

As noted above, during the operation of the gas turbine engine 100 (FIG. 1), a fluid flow through the engine duct 202 may provide a means of thermal energy transfer with another fluid flow thorough the heat exchanger assembly 200. For example, a flow of a first fluid 204 may be directed through the engine duct 202, and exchange thermal energy with a flow of a second fluid 206 within the heat exchanger assembly 200. That is, the flow of the first fluid 204 may be directed through the engine duct 202 to interact with components of the heat exchanger assembly 200 while the flow of the second fluid 206 may flow through the components of the heat exchanger assembly 200 to achieve thermal energy transfer with the flow of the first fluid 204.

Referring still to FIGS. 2-5, the heat exchanger assembly 200 may include a sheet assembly 208 extending circumferentially about an engine duct centerline axis 210 radially inward of the inner surface 201 (FIG. 3) of the engine duct 202. For example, the sheet assembly 208 may be made up of sheets 209. More specifically, the sheet assembly 208 may be made up of at least one sheet and up to five sheets, each of the sheets being spaced from one another in a concentric manner. Additionally, or alternatively, in some cases, the inner and outer walls defining the engine duct 202 may function as sheets 209.

The heat exchanger assembly 200 may further include one or more aerodynamic features 212 extending from the sheet assembly 208. For example, the one or more aerodynamic features 212 may extend radially from the sheet 209. The one or more aerodynamic features 212 may extend in either direction for any suitable length to couple with each of the individual sheets 209 of the sheet assembly 208. For example, the aerodynamic feature 212 may contact multiple sheets 209 within the sheet assembly 208, which may mitigate the flexing of the individual sheets 209 during the operation of the gas turbine engine 100. For example, the one or more aerodynamic features 212 extend from the inner surface 201 (FIG. 3) of the engine duct 202 radially inward towards the engine duct centerline axis 210. Further, the one or more aerodynamic features 212 may extend from the sheet assembly 208 at a first angle 213. For example, the first angle 213 between the one or more aerodynamic features 212 and the sheet assembly 208 may be at least 20 degrees and up to 90 degrees. In various examples, the one or more aerodynamic features 212 may be made up of a set of fins 214, a manifold assembly 216, and/or any suitable configuration of features to achieve the functionality of the heat exchanger assembly 200.

In examples in which the one or more aerodynamic features 212 may be made up of the set of fins 214, the set of fins 214 may be spaced from one another circumferentially by at least a portion of the sheet assembly 208. For example, the set of fins 214 may be spaced from each other in a uniform manner, non-uniform manner, or any suitable manner. Moreover, the one or more aerodynamic features 212 may be made up of at least one set of fins 214 to any practicable number of sets of fins 214. Further, the set of fins 214 may be made up of at least one fin, up to fifty fins, and/or any other practicable number.

Each of the set of fins 214 may define a fin thickness 218. As depicted, the fin thickness 218 may be defined as the length of the fin in the circumferential direction. In some examples, the fin thickness 218 may be uniform along the entire length of the fin in the axial direction. In other cases, the fin thickness 218 may increase or decrease along the axial length of the fin. Further, each of the set of fins 214 may have the same fin thickness 218 as the remaining set of fins 214. In other cases, at least one of the sets of fins 214 may have a varied thickness from at least one of the set of fins 214.

Further, each of the set of fins 214 may include a fin chord length 220. As depicted, the fin chord length 220 may be the length of the fin in the axial direction. For example, each of the set of fins 214 may have the same fin chord length 220. In other cases, at least one of the set of fins 214 may have a fin chord length 220 that is varied from another one of the set of fins 214. Moreover, the fin chord length 220 may be any suitable length to exchange thermal energy with the flow of the first fluid 204 through the engine duct 202.

In various embodiments, the set of fins 214 may further include an axially straight fin section 222 and a cambered fin section 224 section in the axial direction. As depicted, the axially straight fin section 222 may be downstream of the cambered fin section 224. Specifically, the cambered fin section 224 may be twenty percent or more of the fin chord length 220. In some cases, the cambered fin section 224 may be half of the fin chord length 220. In other cases, the fin may include only a cambered fin section 224 with the cambered fin section 224 extending from the leading edge of the fin and the trailing edge of the fin. In some examples, the set of fins 214 may be arranged in such a way in which each of the individual fins is the same shape, in that the cambered fin section 224 and the axially straight fin section 222 are equal in each of the individual fins. In this way, the set of fins 214 may be arranged such that they can nest upon one another. As used herein, "nest" and "nesting" may mean each of the manifold assembly 216 and/or fins 214 maintaining the same shape and allowing for the same distance of separation between each of the fins 214 and a plurality of manifolds 215 in the circumferential direction to be maintained throughout the entire length of each of the manifolds 215 and/or fins 214.

During operation, the flow of the first fluid 204 through the engine duct 202 may interact with the cambered fin section 224. For example, the cambered fin section 224 may assist in creating a more axially-aligned flow of the flow of the first fluid 204 by deswirling the flow of the first fluid 204. As used herein, "deswirl" may mean removing the circumferential component of the flow velocity vector. Particularly, a swirling flow may follow a helical or corkscrew pattern. However, the circumferential motion of airflow does not contribute to the thrust of the gas turbine engine 100. In this way, deswirling the fluid flow from a helical pattern into an axial airflow is beneficial in increasing the efficiency of the thrust production of the gas turbine engine 100. As such, the cambered fin section 224 may interact with the fluid flow, particularly the circumferential component of the flow velocity vector. The cambered fin section 224 may remove the circumferential component in order to achieve a more axially-aligned flow of the first fluid 204.

Each of the set of fins 214 may define a fin height 226. As depicted, the fin height 226 is the length of the fin from the radially inward end section to the radially outward end section. The fin height 226 may be any suitable length to achieve thermal transfer between the flow of the first fluid 204 through the engine duct 202 and the flow of the second fluid 206 through the heat exchanger assembly 200. Each of the set of fins 214 may have a uniform fin height 226, non-uniform fin height 226, or any combination of fin heights 226 relative to one another.

Referring still to FIGS. 2-5, in various cases, the one or more aerodynamic features 212 are arranged as a manifold assembly 216. The manifold assembly 216 may include one or more manifolds 215. Each of the manifolds 215 of the manifold assembly 216 may be spaced from one another by at least a portion of the sheet assembly 208 in the circumferential direction. For example, each of the manifolds 215 of the manifold assembly 216 may be spaced from each other in a uniform manner, non-uniform manner, or any suitable manner. Further, each of the manifolds 215 of the manifold assembly 216 may include a forward fairing 228 and an aft fairing 230. For example, the forward fairing 228 may include the forwardmost portion of the manifold 215, and the aft fairing 230 may include the downstream-most portion of the manifold 215.

In various cases, the manifold assembly 216 may supply and/or return a working fluid from the heat exchanger assembly, such as the second fluid 206. Additionally or alternatively, the manifold assembly 216 may join segments and/or portions of the heat exchanger assembly 200, such as a sheet assembly 208, at least a part of the set of fins 214, or any other components of the heat exchanger assembly 200 to include the entire assembly. In this way, the manifold assembly 216 may mitigate manufacturing restrictions in joining the one or more aerodynamic features 212 to a heat exchanger assembly 200. Further, the arrangement of the manifold assembly 216 may mitigate mechanical limitations in terms of the overall size of the heat exchanger assembly 200 by serving multiple purposes.

In various cases, the manifold assembly 216 may include a first manifold 217 and a second manifold 219. The first manifold 217 may be separated from the second manifold 219 by at least a portion of the sheet 209. For example, the first manifold 217 may be spaced in the circumferential direction from the second manifold 219 with the sheet 209 spanning at least a portion of the space between the first manifold 217 and the second manifold 219. In other cases, the manifold assembly 216 may include any suitable number of manifolds 215.

Each of the manifolds 215 of the manifold assembly 216 may define a manifold thickness 232. As depicted, the manifold thickness 232 may be the length of the manifold 215 spanning from opposite endpoints on the surface of the manifold 215 in the circumferential direction. For example, each of the manifolds 215 in the manifold assembly 216 may include a uniform manifold thickness 232, a non-uniform manifold thickness 232, or any combination of thicknesses. In various examples, the first manifold 217 may define a first manifold thickness, and the second manifold 219 may define a second manifold thickness. The first manifold thickness may be the same as the second manifold thickness. In other cases, the first manifold thickness may be different from the second manifold thickness.

Each of the manifolds 215 in the manifold assembly 216 may further define a manifold chord length 234. As depicted, the manifold chord length 234 may be the length of the manifold 215 spanning from opposite endpoints on the surface of the manifold 215 in the axial direction, such as from the forward fairing 228 to the aft fairing 230. For example, each of the manifolds 215 in the manifold assembly 216 may define a uniform manifold chord length 234, a non-uniform manifold chord length 234, or any combination of manifold chord lengths 234. For example, the first manifold 217 may define a first manifold chord length and the second manifold 219 may define a second manifold chord length. The first manifold chord length may be the same as the second manifold chord length. In other cases, the first manifold chord length may be different from the second manifold chord length.

In various cases, the manifold chord length 234 may further include an axially straight manifold section 236 and a cambered manifold section 238. As depicted, the axially straight manifold section 236 may be downstream of the cambered manifold section 238. Specifically, the cambered manifold section 238 may be twenty percent or more of the manifold chord length 234. In some cases, the cambered manifold section 238 may be half of the manifold chord length 234. In other cases, the manifold chord length 234 may include only the cambered manifold section 238 with the cambered manifold section 238 extending from the forward fairing 228 and the aft fairing 230. For example, the manifold assembly 216 may be arranged in such a way in which each of the individual manifolds 215 is the same shape in that the cambered manifold section 238 and the axially straight manifold section 236 are equal throughout the manifold assembly 216. In this way, the manifold assembly 216 may be arranged such that they are able to nest upon one another.

During operation, the flow of the first fluid 204 through the engine duct 202 may interact with the cambered manifold section 238. For example, the cambered manifold section 238 may assist in creating a more axially-aligned flow of the flow of the first fluid 204 by deswirling the flow of the first fluid 204. Similar to the function of the cambered fin section 224 noted above, the cambered manifold section 238 may function in a similar way. More specifically, the thrust efficiency of the gas turbine engine may be increased through a more axially-aligned flow created through the interaction of the circumferential component of the fluid flow, particularly the flow velocity vector, and the cambered manifold section 238.

In various cases, each of the manifolds 215 of the manifold assembly 216 may further define a manifold height 240. As depicted, the manifold height 240 may be the length of the manifold 215 spanning from opposite endpoints on the surface of the manifold 215 in the radial direction, such as a radially inner end and a radially outer end. For example, each of the manifolds 215 of the manifold assembly 216 may define a uniform manifold height 240, a non-uniform manifold height 240, or any combination of manifold heights 240. For example, the first manifold 217 may define a first manifold height and the second manifold 219 may define a second manifold height. The first manifold height may be the same as the second manifold height. In other cases, the first manifold height may be different from the second manifold height.

Referring still to FIGS. 2-5, the one or more aerodynamic features 212 may include a combination of the set of fins 214 and the manifold assembly 216 as depicted. For example, the heat exchanger assembly 200 may have the first manifold 217 and the second manifold 219 separated from one another in the circumferential direction. Further, the heat exchanger assembly 200 may include at least a portion of the set of fins 214 between the first manifold 217 and the second manifold 219. In other cases, the heat exchanger assembly 200 may include any number of manifolds 215 separated from one another in the circumferential direction. At least a portion of the set of fins 214 may be positioned between each of the manifolds 215. The space between each of the manifolds 215 may have at least one fin, up to thirty fins, and/or any other practicable number of fins. Further, the sheet assembly 208 may extend between each of the aerodynamic features 212 in the circumferential direction.

Moreover, the one or more aerodynamic features 212, such as a combination of the set of fins 214 and the manifold assembly 216, may be arranged in a nested manner. As described in more detail above, the manifold chord length 234 may include the axially straight manifold section 236 and the cambered manifold section 238. Further, the fin chord length 220 may include the axially straight fin section 222 and the cambered fin section 224. As depicted, the axially straight manifold section 236 and the axially straight fin section 222 may be the same length throughout the entire heat exchanger assembly 200 in such a way that each of the one or more aerodynamic features 212 may form a nested arrangement with one another. For example, each of the cambered manifold sections 238 may have the same camber as each of the cambered fin sections 224. In this way, the manifolds 215 and fins 214 are arranged in such a way that the same distance of separation between each of the fins and each of the manifolds 215 in the circumferential direction is maintained throughout the length of each of the manifolds 215 and/or fins 214. In other cases, the manifold chord length 234 may only include the cambered manifold section 238, and the fin chord length 220 may only include the cambered fin section 224. In such cases, the manifold assembly 216 and the set of fins 214 may be arranged such that the camber of each of the manifolds 215 and the fins 214 are parallel to one another, allowing for the same distance of separation between each of the fins 214 and the manifolds 215 in the circumferential direction to be maintained throughout the entire length of each of the manifolds 215 and/or fins 214.

In various cases, the set of fins 214 may further define a fin thickness to chord ratio. As used herein, the fin thickness to chord ratio is the ratio of the fin thickness 218 to the fin chord length 220. Moreover, the manifold assembly 216 may further define a manifold thickness to chord ratio. As used herein, the manifold thickness to chord ratio is the ratio of the manifold thickness 232 to the manifold chord length 234. In various cases, the manifold thickness to chord ratio may be larger than the fin thickness to chord ratio. Further, the manifold chord length 234 for each of the manifolds 215 of the manifold assembly 216 may be longer than the fin chord length 220 for each of the fins of the set of fins 214.

Referring still to FIGS. 2-5, the manifold chord length 234 may be larger than the manifold height 240. For example, the manifold chord length 234 may be two times the length of the manifold height 240. In other cases, the manifold chord length 234 may be three times the length of the manifold height 240. Further, the manifold chord length 234 may be any multiple greater than one times the length of the manifold height 240. Moreover, the fin chord length 220 may be larger than the fin height 226. For example, the fin chord length 220 may be two times the length of the fin height 226. In other cases, the fin chord length 220 may be three times the length of the fin height 226. Further, the fin chord length 220 may be any multiple greater than one times the length of the fin height 226.

In various cases, the manifold chord length 234 may be larger than the manifold thickness 232. For example, the manifold chord length 234 may be eight times the manifold thickness 232. In other cases, the manifold chord length 234 may be twenty times the manifold thickness 232. Further, the manifold chord length 234 may be any multiple greater than five times the manifold thickness 232. Moreover, the fin chord length 220 may be larger than the fin thickness 218. For example, the fin chord length 220 may be eight times the fin thickness 218. In other cases, the fin chord length 220 may be twenty times the fin thickness 218. Further, the fin chord length 220 may be any multiple greater than five times the fin thickness 218.

Referring still to FIGS. 2-5, the heat exchanger assembly 200 may be arranged in such a way that each of the manifolds 215 of the manifold assembly 216 and each of the set of fins 214 couple to each of the circumferentially extending sheets 209 of the sheet assembly 208. In this way, the manifold assembly 216 and/or the set of fins 214 may mitigate the flexing of sheet assembly 208 during the operation of the heat exchanger assembly 200. In other cases, the sheet assembly 208 may include two or more sheets 209. The sheets 209 may be arranged in a concentric manner about one another. As depicted, the manifold assembly 216 and/or the set of fins 214 couple to the two or more sheets 209 of the sheet assembly 208 in such a way that the sheet assembly 208 may be coupled to one another through the manifold assembly 216 and/or the set of fins 214.

The heat exchanger assembly 200 may further define a plurality of conduits 242 defined by the intersections of the manifold assembly 216 and/or the set of fins 214 with the sheet assembly 208. As depicted, the arrangement of the manifold assembly 216, the set of fins 214, and the sheet assembly 208, in combination, forms a plurality of conduits 242 for the flow of the first fluid 204 through the engine duct 202 to pass through and interact with the heat exchanger assembly 200, as described in more detail below.

During operation, the flow of the first fluid 204 may interact with the plurality of conduits 242. For example, the first fluid 204 may be deswirled through the cambered manifold sections 238 of the manifold assembly 216 and/or the cambered fin section 224 of the set of fins 214. More specifically, the flow of the first fluid 204 may be directed through the plurality of conduits 242 to interact with the cambered manifold sections 238 of the manifold assembly 216 and/or the cambered fin sections 224 of the set of fins 214. In this, the thrust efficiency of the gas turbine engine may be increased through a more-axially aligned flow created through the interaction of the circumferential component of the fluid flow, particularly the flow velocity vector, the cambered manifold section 238 of the manifold assembly 216, and/or the cambered fin section 224 of the set of fins 214.

Figure 6:
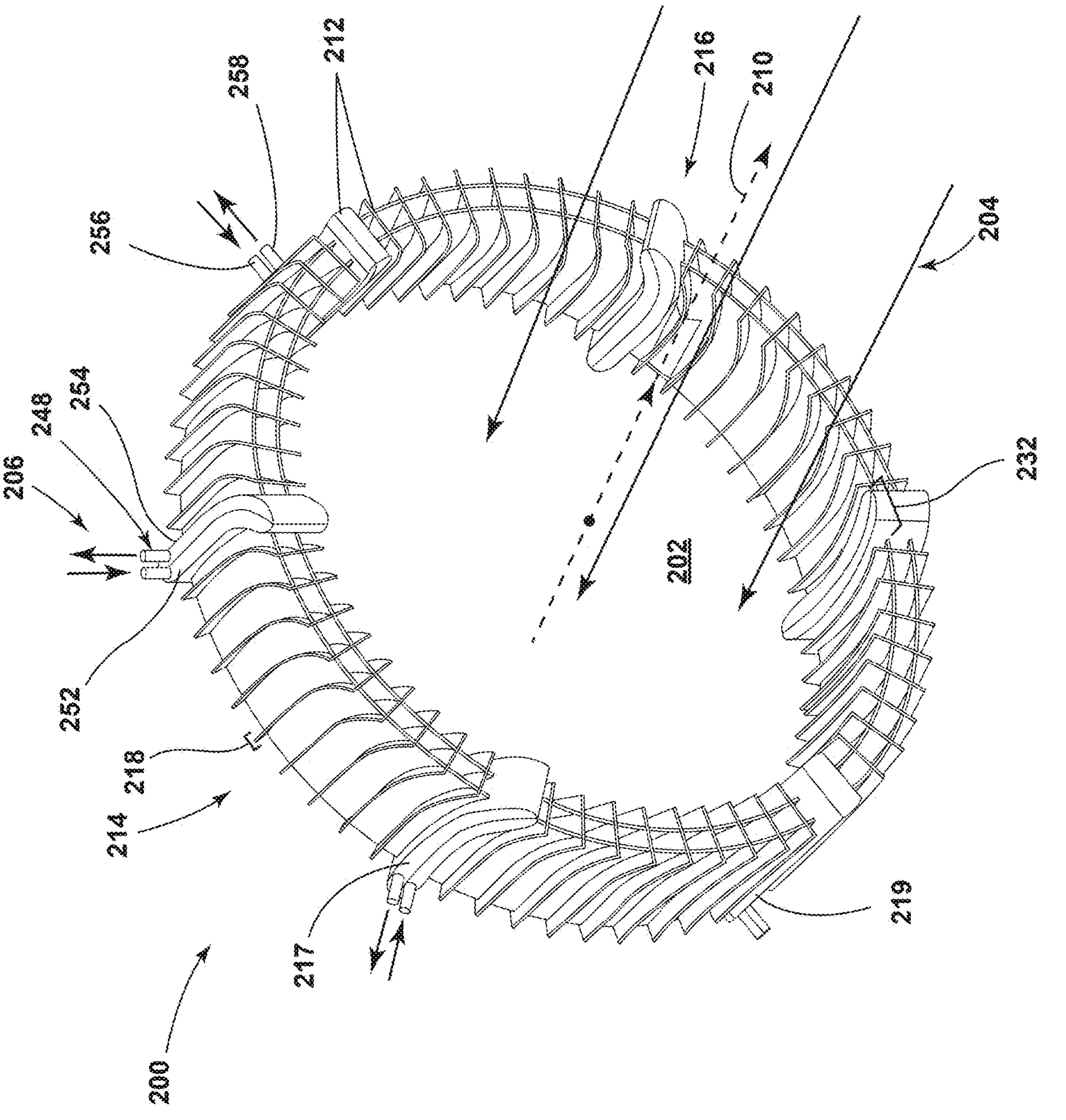
FIG. 6 is a perspective view of the heat exchanger assembly including a fluid circulation system in accordance with various aspects of the present disclosure.
Figure 7:
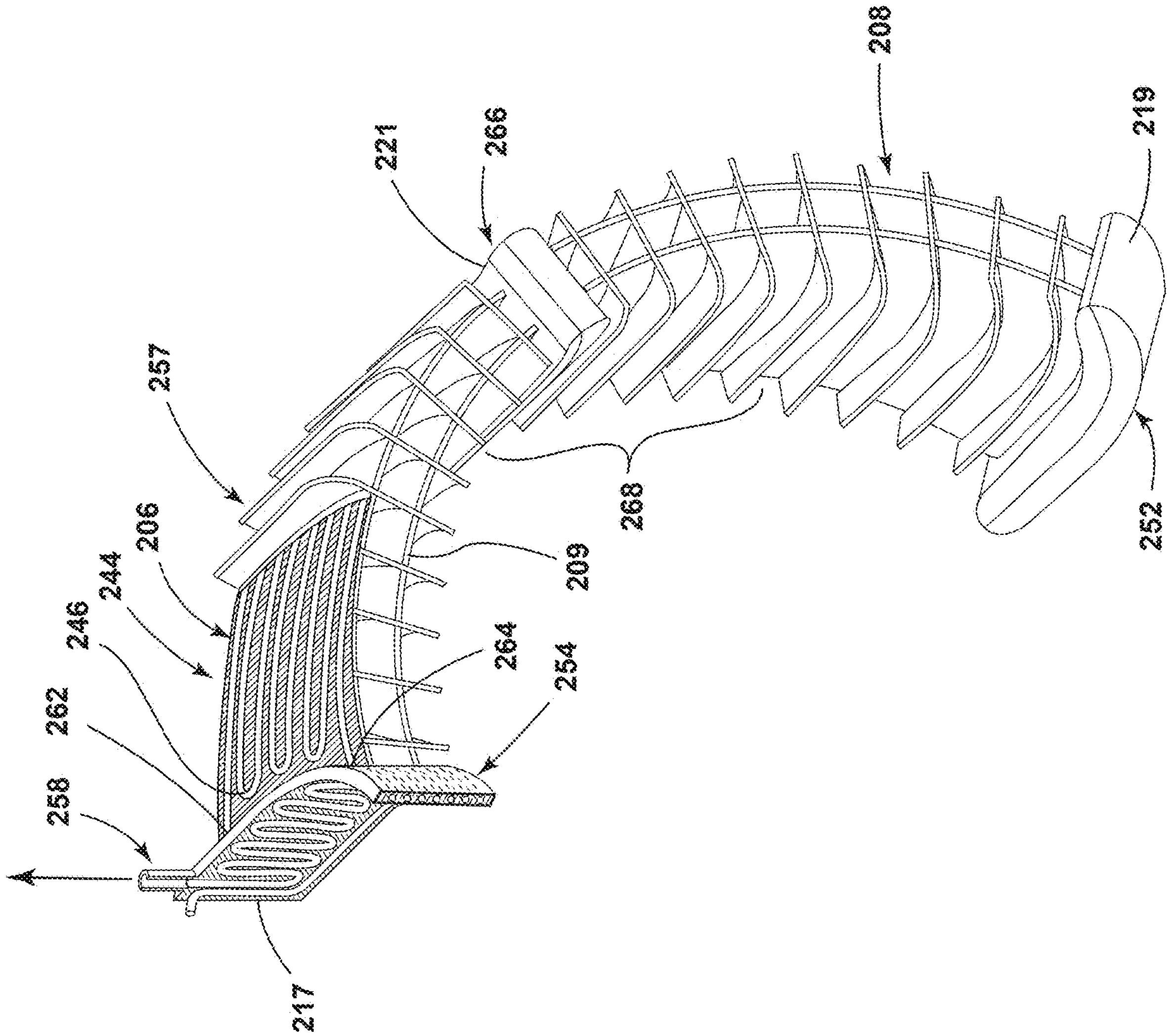
FIG. 7 is a perspective view of a single core segment of the heat exchanger assembly displaying a portion of the fluid circulation system in accordance with various aspects of the present disclosure.
Figure 8:
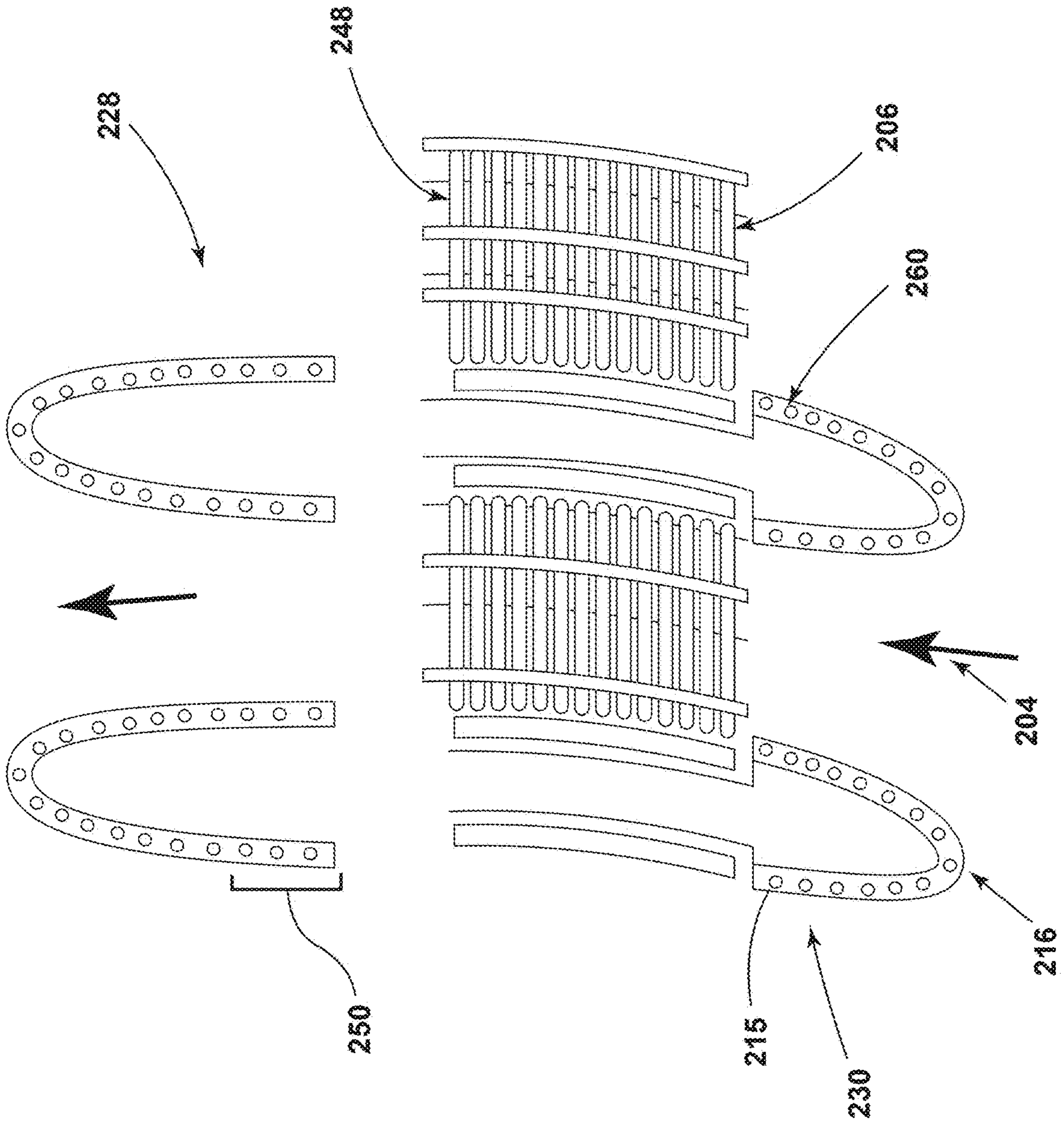
FIG. 8 is a cut-away view along the line VIII-VIII of FIG. 7 illustrating a portion of a manifold assembly of the heat exchanger assembly in accordance with various aspects of the present disclosure.

Referring now to FIGS. 6-8, the heat exchanger assembly 200 may further include a passage assembly 244 within the sheet assembly 208. The passage assembly 244 may be positioned within each of the sheets 209 and configured to direct the flow of the second fluid 206 circumferentially about the engine duct centerline axis 210, which may be along each of the sheets 209 of the sheet assembly 208. As depicted, the passage assembly 244 may extend from a forward end portion and wind axially towards a downstream end portion of the sheet assembly 208. For example, the passage assembly 244 may extend circumferentially first in a clockwise direction, then turn back into a counter-clockwise direction, forming a passage winding 246, or vice versa. This pattern may be repeated any number of times extending in the axial direction. For example, the passage assembly 244 may be made up of at least one passage winding 246 and up to fifty passage windings 246 extending in the axial direction. In other cases, the passage assembly 244 may be made up of any suitable number of passage windings 246 to transfer thermal energy between the flow of the first fluid 204 and the flow of the second fluid 206.

The heat exchanger assembly 200 may further include a channel assembly 248 within the manifold assembly 216. The channel assembly 248 may be positioned within each of the manifolds 215 of the manifold assembly 216 and arranged to direct a fluid flow radially along the surface of the manifold assembly 216 in such a way as to transfer thermal energy from or to the first fluid 204. For example, the channel assembly 248 may be positioned to fluidly couple with the passage assembly 244 in order to transfer the flow of the second fluid 206 between the manifold assembly 216 and the sheet assembly 208. As depicted specifically in FIG. 8, the channel assembly 248 may flow inward radially along the surface of the manifold 215, then turn back radially outward along the surface of the manifold 215, or vice versa, forming a channel winding 250. This pattern may be repeated any number of times extending along the surface of the manifold 215.

The manifold assembly 216 may further include an inlet manifold portion 252 and an outlet manifold portion 254. As depicted, the inlet manifold portion 252 and the outlet manifold portion 254 may form two halves of an individual manifold 215. For example, the inlet manifold portion 252 may be adjacent in the circumferential direction to the outlet manifold portion 254, coupled to one another. Specifically, the adjacent manifold portions 252, 254 may be welded, brazed, bolted, or any other suitable means for mechanical coupling to one another. In various cases, the inlet manifold portion 252 and the outlet manifold portion 254 may be left separate to move independently during the operation of the heat exchanger assembly 200. In various cases, the inlet manifold portion 252 and the outlet manifold portion 254 may form separate structures. In other cases, the inlet manifold portion 252 and the outlet manifold portion 254 may be a singular structure separated by an internal dividing wall. Further, the inlet manifold portion 252 may be fluidly coupled to the outlet manifold portion 254 through at least a portion of the channel assembly. For example, the channel assembly may define a channel inlet 256 on the inlet manifold portion 252 and a channel outlet 258 on the outlet manifold portion 254.

In various cases, the manifold assembly 216 may further include an intermediate manifold 266. As depicted, the intermediate manifold 266 may be made up of the inlet manifold portion 252 and the outlet manifold portion 254 but may not include the channel inlet 256 and the channel outlet 258 of the channel assembly 248. For example, the inlet manifold portion 252 and the outlet manifold portion 254 of the intermediate manifold 266 may be welded together and may not include an internal dividing wall between the two adjacent portions of the intermediate manifold 266. In some examples, the one or more aerodynamic features 212 may include a manifold assembly that includes a first manifold 217, a second manifold 219, and an intermediate, or the third manifold 266, positioned between the first manifold 217 and the second manifold 219. A first set of fins 214 may extend circumferentially from the sheet assembly 208 between the first manifold 217 and the third manifold 266. Additionally or alternatively, a second set of fins 214 may extend circumferentially from the sheet assembly 208 between the third manifold 266 and the second manifold 219.

Moreover, in various cases, the heat exchanger assembly 200 may define a plurality of segments 268. Each of the segments 268 may be separated circumferentially by adjacent individual manifolds 215 of the manifold assembly 216. As depicted, the heat exchanger assembly 200 may include at least a first heat exchanger segment that includes at least a portion of the manifold assembly 216, a set of fins 214, and at least a portion of the sheet assembly 208. In various cases, the first heat exchanger segment 257 may be defined as a segment between the first manifold 217 separated circumferentially from the second manifold 219. The first heat exchanger segment 257 may further include the set of fins 214 between the first manifold 217 and the second manifold 219. The set of fins 214 may be spaced from one another circumferentially in the space therebetween. For example, the first manifold 217 and the second manifold 219 may each include the inlet manifold portion 252 and the outlet manifold portion 254. Moreover, the first manifold 217, the second manifold 219, and the set of fins 214 are coupled to the sheet assembly 208. In other cases, the first heat exchanger segment 257 may be defined as having the first manifold 217 separated circumferentially from the second manifold 219 with a third manifold 221 therebetween. The first heat exchanger segment 257 may further include a set of fins 214 spaced from one another circumferentially in the space between the first manifold 217 and the third manifold 221, and the space between the second manifold 219 and the third manifold 221. For example, the third manifold 221 may be an intermediate manifold 266, while the first manifold 217 and the second manifold 219 each include the channel inlet 256 and the channel outlet 258. Moreover, the first manifold 217, the second manifold 219, the third manifold 221, and the set of fins 214 are coupled to the sheet assembly 208.

Generally, the heat exchanger assembly 200 may be used to exchange thermal energy between various fluids within the gas turbine engine 100 to be utilized in the operation of various components. In some cases, the heat exchanger assembly 200 may include a deswirling mechanism to create a more axially-aligned flow through the heat exchanger assembly 200 and surrounding engine duct 202 without the inclusion of the deswirling feature (e.g. the outlet guide vane arrangement) for the functionality of the heat exchanger assembly 200. That is, the deswirling mechanism may remove the circumferential component of the flow velocity vector of the flow through the heat exchanger assembly 200. For instance, the heat exchanger assembly 200 may include one or more aerodynamic features 212 extending into at least one of the inlet duct 180, the fan duct 172, and/or the core duct 142 to increase the efficiency of the heat exchanger assembly 200 while simultaneously adjusting and/or eliminating the circumferential component of the flow velocity vector of the fluid flow. In this way, the pressure drop across the heat exchanger assembly 200 may be mitigated, thus contributing to improved engine performance. Further, the axial length of the heat exchanger assembly 200 may be reduced due to the mitigation of the pressure drop, providing benefits for packaging.

During operation, the flow of the first fluid 204 through the engine duct 202 is directed through the plurality of conduits 242 defined by the components of the heat exchanger assembly 200. The flow of the first fluid 204 may be deswirled by the cambered manifold section 238 of the manifold assembly 216 and/or the cambered fin sections 224 of the set of fins 214. While the flow of the first fluid 204 is in contact with the manifold assembly 216, the sheet assembly 208, and the set of fins 214, the flow of the second fluid 206 may be directed through the channel inlet 256 of the inlet manifold portion 252. The flow of the second fluid 206 is then directed through at least a portion of the channel assembly 248 along the surface of the manifold assembly 216. The flow of the first fluid 204 may make thermal contact with the surface of the manifold 215, thus exchanging thermal energy with the flow of the second fluid 206 in this way. Further, the flow of the second fluid 206 is then directed from the channel assembly 248 into the passage assembly 244 of the sheet assembly 208. The flow of the first fluid 204 may make thermal contact with the surface of the sheet assembly 208, thus exchanging thermal energy with the flow of the second fluid 206 within the passage assembly 244 in this way. The flow of the second fluid 206 is then returned from the passage assembly 244 back into the channel assembly 248 located within the manifold assembly 216. The flow of the second fluid 206 is then directed into the outlet manifold portion 254 within the channel assembly 248 and back out into the gas turbine engine 100 through the channel outlet 258.

In other cases, the channel assembly 248 directs a third fluid flow 260 along the surface of the manifold 215. For example, the channel assembly 248 and the passage assembly 244 may not be fluidly coupled, and instead, the flow of the second fluid 206 and the third fluid flow 260 interact with the flow of the first fluid 204 separately. In this way, the channel assembly 248 winds along the surface of the manifold 215 to transfer thermal energy with the flow of the first fluid 204. During operation, the flow of the first fluid 204 may be directed through the plurality of conduits 242 defined by the components of the heat exchanger assembly 200. The flow of the first fluid 204 may contact the sheet assembly 208 and the manifold assembly 216. In this way, the flow of the first fluid 204 may exchange thermal energy with the flow of the second fluid 206 within the sheet assembly 208 and the third fluid flow 260 within the manifold assembly 216. The third fluid flow 260 may flow along the surface of the manifold 215, entering the manifold 215 through the channel inlet 256, flowing along the surface of the manifold 215 in a serpentine fashion, and then exiting the manifold 215 through the channel outlet 258. The flow of the second fluid 206 may enter the passage assembly 244 through a passage inlet 262 located on the surface of the sheet 209 and flow along the surface of the sheet 209 in the manner described in more detail above. Further, the flow of the second fluid 206 may then exit the passage assembly through a passage outlet 264 located on the surface of the sheet 209.

The heat exchanger assembly 200 may include any suitable arrangement to provide a deswirling effect to the flow of the first fluid 204 and transfer thermal energy with a second and/or third fluid flow located within the heat exchanger assembly 200 without departing from the scope of the present disclosure.

Figure 9:
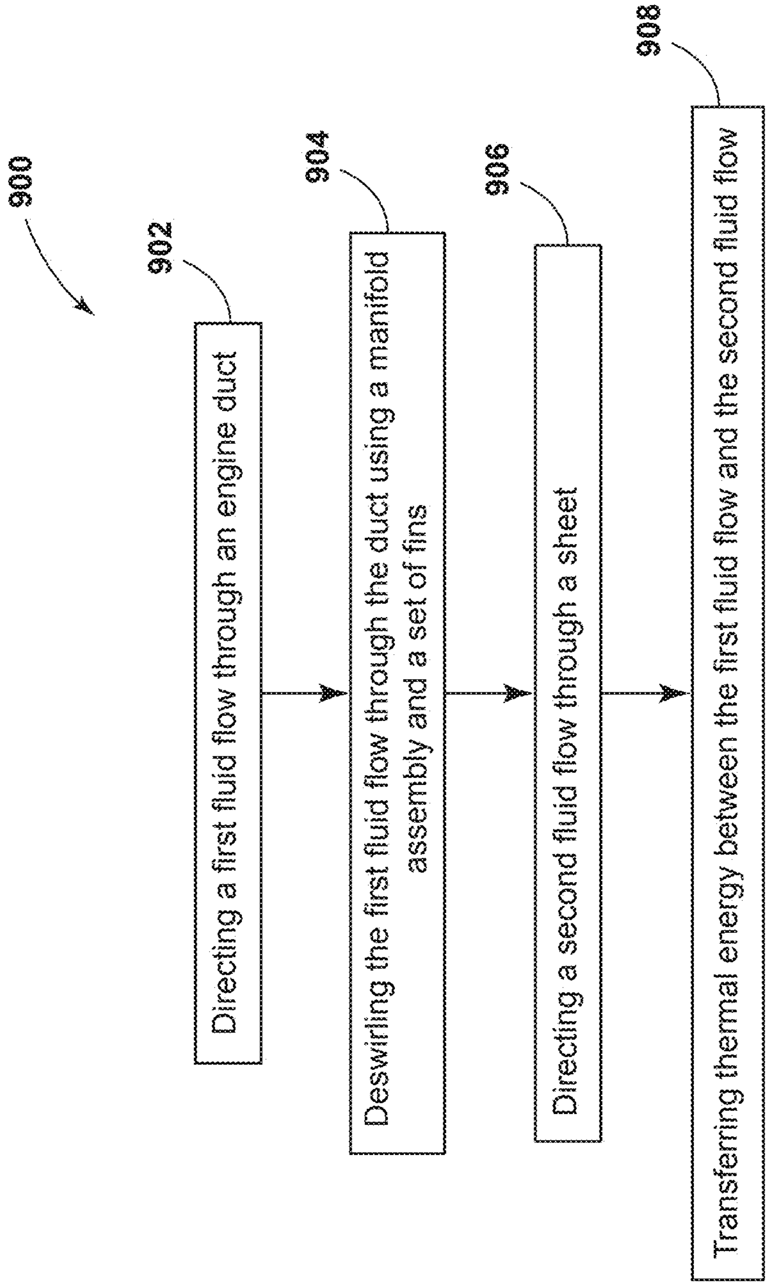
FIG. 9 illustrates a diagram of a method for transferring thermal energy between a flow of a first fluid and a flow of a second fluid in accordance with various aspects of the present disclosure.

Referring now to FIG. 9, the diagram of a method for transferring thermal energy between a flow of a first fluid 204 and a flow of a second fluid 206 in accordance with various aspects of the present disclosure is provided. In general, the method will be described herein with reference to the gas turbine engine 100 and the heat exchanger assembly 200 described above with reference to FIGS. 2-8. However, it will be appreciated by those of ordinary skill in the art that the disclosed method may generally be utilized with any suitable cooling system configuration. In addition, although FIG. 9 depicts the steps performed in a particular order for purposes of illustration and discussion, the methods discussed herein are not limited to any particular order or arrangement. One skilled in the art, using the disclosures provided herein, will appreciate the various steps of the methods disclosed herein can be omitted, rearranged, combined, and/or adapted in various ways without deviating from the scope of the present disclosure.

At step 902, method 900 may include directing a flow of a first fluid through an engine duct. As described above, directing a flow of a first fluid through the engine duct may involve a flow through the inlet duct, the core duct, or the fan duct. Further, the flow of the first fluid may be any suitable flow for propelling the gas turbine engine. For example, the flow of the first fluid may be a core fluid flow or an additional fluid flow through a third stream arrangement.

At step 904, method 900 may include deswirling the flow of the first fluid through the engine duct using a manifold assembly and a set of fins. As described above, the flow of the first fluid may contact the heat exchanger assembly that is assembled annularly about the engine duct. In this, the heat exchanger assembly may include a deswirling element (i.e. cambered manifold section and/or cambered fin section), allowing for deswirling the first flow through the engine duct using the manifold assembly and/or the set of fins. As such, the flow of the first fluid is directed through the plurality of conduits defined by the components of the heat exchange assembly, including the manifold assembly and the set of fins. The cambered manifold section of the manifold assembly and/or cambered fin section of the set of fins may create a deswirling effect for the flow of the first fluid through the engine duct. For example, the flow of the first fluid may interact with the cambered manifold section of the manifold assembly and/or cambered fin section of the set of fins while directed through the plurality of conduits, thus deswirling the fluid flow because of the aerodynamic interaction between the flow of the first fluid and the cambered manifold section and/or the cambered fin section.

At step 906, method 900 may include directing a flow of a second fluid through a sheet. As described above, the flow of the second fluid may flow through the sheet using the passage assembly arranged within each of the sheets of the sheet assembly. For example, the flow of the second fluid may enter the passage assembly by first entering the heat exchanger assembly through the channel inlet in the inlet manifold portion of the manifold assembly. The flow of the second fluid then flows through the passage assembly arranged inside of the sheet, consisting of multiple windings that extend in the axially downstream direction along the sheet.

At step 908, method 900 may include transferring thermal energy between the flow of the first fluid and the flow of the second fluid. As described above, as the flow of the second fluid is directed through the sheet, the flow of the first fluid contacts the sheet. Through this, the flow of the second fluid and the flow of the first fluid can exchange thermal energy. For example, the flow of the second fluid may be directed through the sheet in a serpentine arrangement close to the surface of the sheet. The flow of the first fluid is directed through the plurality of conduits, interacting with the surfaces of the manifold assembly, the set of fins, and the sheet assembly. As such, the flow of the first fluid and the flow of the second fluid can exchange thermal energy. Following the transfer of thermal energy, the flow of the second fluid is then directed out towards the outlet manifold portion to be returned to the gas turbine engine through the channel outlet.

In other cases, method 900 may further include directing the flow of the first fluid through a plurality of conduits defined by the manifold assembly, the set of fins, and the sheet. As described above, the flow of the first fluid may be directed thorough a plurality of conduits that are defined by the manifold assembly, the plurality of cambered fins, and the sheet to deswirl the flow of the first fluid. In being directed through the plurality of conduits, the flow of the first fluid is increasing contact with the heat exchanger assembly, allowing for increased efficiency in the thermal energy transfer between the flow of the first fluid and the flow of the second fluid directed along the inner surface of the heat exchanger assembly.

In other cases, method 900 may further include directing the flow of the second fluid through a passage assembly within the sheet, directing the flow of the second fluid from the passage assembly to channel assembly within the manifold assembly, and directing the flow of the second fluid through the channel assembly within the manifold assembly. As described above, the flow of the second fluid may be directed into the passage assembly, consisting of at least one passage. For example, the passage assembly may include a serpentine arrangement along the inside of the sheet. The passage assembly may direct the fluid in a winding arrangement extending in an axially downstream direction. After the flow of the second fluid reaches the axially downstream end of the sheet, the flow of the second fluid is then directed into the channel assembly housed within one of the manifolds of the manifold assembly. For example, the flow of the second fluid may be directed through a fitting between the passage assembly and the channel assembly to fluidly couple the two assemblies to one another.

In other cases, method 900 may further include directing the flow of the second fluid along a surface of the manifold assembly and the sheet and thermally contacting the surface of the manifold assembly and the sheet with the flow of the first fluid. As described in more detail above, the flow of the second fluid may be directed through a passage assembly housed within the sheet. For example, the passage assembly may be near the surface of the sheet to allow the flow of the second fluid to exchange thermal energy with the flow of the first fluid when the flow of the first fluid is in contact with the outer surface of the sheet. Further, the flow of the second fluid may be directed from the passage assembly within the sheet to the channel assembly of the manifold assembly. The flow of the second fluid may be directed through the channel assembly housed within the manifold assembly. For example, the channel assembly may be near the surface of the manifold assembly to allow the flow of the second fluid to exchange thermal energy with the flow of the first fluid when the flow of the first fluid is in contact with the outer surface of the manifold assembly.

The present disclosure may generally relate to a gas turbine engine 100 and the heat exchanger assembly 200. Generally, the gas turbine engine 100 may include a deswirling feature (e.g. an outlet guide vane arrangement) at a mid-fan location and/or a low pressure turbine 134 location upstream of the heat exchanger assembly 200. The heat exchanger assembly 200 may be used to exchange thermal energy between various fluids within the gas turbine engine 100 to be utilized in the operation of various components. The deswirling feature may typically deswirl the flow upstream of the heat exchanger assembly 200. That is, the deswirling feature may remove a circumferential component of a flow velocity vector of the flow upstream of the heat exchanger assembly 200. However, this arrangement may introduce unwanted pressure drops across the heat exchanger assembly 200 that impact engine performance. As such, the heat exchanger assembly 200 may include a deswirling mechanism arranged to create a more axially-aligned flow through the heat exchanger assembly 200 and surrounding engine duct 202 without the inclusion of the deswirling feature for the functionality of the heat exchanger assembly 200. For instance, the heat exchanger assembly 200 may include one or more aerodynamic features 212 extending into at least one of the inlet duct 180, the fan duct 172, and/or the core duct 142 to increase the efficiency of the heat exchanger assembly 200 while simultaneously adjusting and/or eliminating the circumferential component of the flow velocity vector of the fluid flow. In this way, the pressure drop across the heat exchanger assembly 200 may be mitigated, thus contributing to improved engine performance. Further, the axial length of the heat exchanger assembly 200 may be reduced due to the mitigation of the pressure drop, providing benefits for packaging.

Further aspects are provided by the subject matter of the following clauses:

A gas turbine engine defining a radial direction and an axial direction, the gas turbine engine comprising: an inlet duct comprising a splitter; a fan duct downstream from the inlet duct and the splitter; a core duct downstream of the inlet duct and the splitter, the core duct being radially inward of the fan duct; and a heat exchanger assembly extending annularly about at least one of the inlet duct, the fan duct, or the core duct, the heat exchanger assembly comprising: a sheet extending circumferentially about the at least one of the inlet duct, the fan duct, and the core duct; and one or more aerodynamic features extending from the sheet, the one or more aerodynamic features within the at least one of the inlet duct, the fan duct, and the core duct.

The gas turbine engine of any preceding clause, wherein the one or more aerodynamic features includes at least one set of fins, wherein each fin of the at least one set of fins defines a fin thickness and a fin chord length.

The gas turbine engine of any preceding clause, wherein the one or more aerodynamic features includes a manifold assembly including a first manifold defining a manifold thickness and a manifold chord length.

The gas turbine engine of any preceding clause, wherein the manifold assembly further comprises: a second manifold separated from the first manifold by at least a portion of the sheet.

The gas turbine engine of any preceding clause, wherein the one or more aerodynamic features includes a fin defining a fin thickness and a fin chord length, the one or more aerodynamic features further including a manifold defining a manifold thickness and a manifold chord length.

The gas turbine engine of any preceding clause, wherein a ratio of the manifold thickness to the manifold chord length is larger than that of the ratio of the fin thickness to the fin chord length.

The gas turbine engine of any preceding clause, wherein the manifold defines a manifold height, and the fin defines a fin height, wherein the manifold chord length is at least two times that of the manifold height, and wherein the fin chord length is at least two times that of the fin height.

The gas turbine engine of any preceding clause, wherein the fin and the manifold each include an axially straight section and a cambered section.

The gas turbine engine of any preceding clause, wherein the sheet includes a passage assembly.

The gas turbine engine of any preceding clause, wherein the first manifold and the second manifold of the manifold assembly each include a respective channel assembly, and wherein the passage assembly is fluidly coupled with the respective channel assembly.

The gas turbine engine of any preceding clause, wherein the heat exchanger assembly defines a segment between the first manifold and the second manifold, wherein the heat exchanger assembly includes a set of fins extending circumferentially between the first manifold and the second manifold, and wherein the first manifold, the second manifold, and the set of fins are coupled to the sheet.

The gas turbine engine of any preceding clause, wherein the heat exchanger assembly further comprises: a third manifold positioned between the first manifold and the second manifold; a first set of fins extending circumferentially between the first manifold and the third manifold; and a second set of fins extending circumferentially between the third manifold and the second manifold.

A heat exchanger assembly defining a radial direction, a circumferential direction, an axial centerline for a gas turbine engine, the heat exchanger assembly comprising: a sheet extending circumferentially about the axial centerline; and one or more aerodynamic features extending from the sheet, the one or more aerodynamic features positioned within the at least one of an inlet duct, a fan duct, and a core duct.

The heat exchanger assembly of any preceding clause, further comprising: a manifold assembly including a first manifold and a second manifold, the second manifold separated from the first manifold by at least a portion of the sheet.

The heat exchanger assembly of any preceding clause, further comprising: a set of fins, wherein the first manifold and the second manifold each define a manifold thickness and a manifold chord length, wherein each of the set of fins define a fin thickness and fin chord length.

The heat exchanger assembly of any preceding clause, wherein a ratio of the manifold thickness to the manifold chord length is larger than that of the ratio of the fin thickness to the fin chord length.

The heat exchanger assembly of any preceding clause, wherein the one or more aerodynamic features further includes at least one set of fins.

The heat exchanger assembly of any preceding clause, wherein the set of fins, the first manifold, and the second manifold each include an axially straight section and a cambered section.

The heat exchanger assembly of any preceding clause, further comprises: a third manifold, wherein the third manifold is between the first manifold and the second manifold; a first set of fins extending circumferentially between the first manifold and the third manifold; and a second set of fins extending circumferentially between the third manifold and the second manifold.

The heat exchanger assembly of any preceding clause, wherein the first manifold and the second manifold each include a channel inlet and a channel outlet, wherein the third manifold is an intermediate manifold.

A method of cooling a fluid of a gas turbine engine, the method comprising: directing a flow of a first fluid through an engine duct; deswirling the flow of the first fluid through the engine duct using a manifold assembly and a set of fins; directing a flow of a second fluid through a sheet; and transferring thermal energy between the flow of the first fluid and the flow of the second fluid.

The method of any preceding clause, wherein deswirling the first fluid through the engine duct using a manifold assembly and a set of fins further comprises: directing the flow of the first fluid through a plurality of conduits defined by the manifold assembly, the set of fins, and the sheet.

The method of any preceding clause, wherein directing a flow of a second fluid through a sheet further comprises: directing the flow of the second fluid through the passage assembly within the sheet, directing the flow of the second fluid from the at passage assembly to a channel assembly within the manifold assembly; and directing the flow of the second fluid through the channel assembly within the manifold assembly.

The method of any preceding clause, wherein transferring thermal energy between the first fluid and the second fluid further comprises: directing the flow of the second fluid along a surface of the manifold assembly and the sheet; and thermally contacting the surface of the manifold assembly and the sheet with the flow of the first fluid.

A heat exchanger assembly defining a radial direction, a circumferential direction, an axial centerline for a gas turbine engine, the heat exchanger assembly comprising: a sheet extending circumferentially about the axial centerline; and one or more aerodynamic features extending from the sheet and forming an angle with the sheet, the one or more aerodynamic features positioned within the at least one of an inlet duct, a fan duct, and a core duct.

This written description uses examples to disclose the present disclosure and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine defining a radial direction and an axial direction, the gas turbine engine comprising:

an inlet duct comprising a splitter;

a fan duct downstream from the inlet duct and the splitter;

a core duct downstream of the inlet duct and the splitter, the core duct being radially inward of the fan duct; and a heat exchanger assembly extending annularly about at least one of the inlet duct, the fan duct, or the core duct, the heat exchanger assembly comprising:

a sheet extending circumferentially about the at least one of the inlet duct, the fan duct, and the core duct; and one or more aerodynamic features extending from the sheet, the one or more aerodynamic features within the at least one of the inlet duct, the fan duct, and the core duct, wherein the one or more aerodynamic features includes a manifold assembly including a first manifold defining a manifold thickness and a manifold chord length and a second manifold separated from the first manifold by at least a portion of the sheet.

2. The gas turbine engine of claim 1, wherein the one or more aerodynamic features includes at least one set of fins, wherein each fin of the at least one set of fins defines a fin thickness and a fin chord length.

3. The gas turbine engine of claim 1, wherein the one or more aerodynamic features includes a fin defining a fin thickness and a fin chord length, the one or more aerodynamic features further including a manifold defining a manifold thickness and a manifold chord length.

4. The gas turbine engine of claim 3, wherein a ratio of the manifold thickness to the manifold chord length is larger than that of the ratio of the fin thickness to the fin chord length.

5. The gas turbine engine of claim 3, wherein the manifold defines a manifold height, and the fin defines a fin height, wherein the manifold chord length is at least two times that of the manifold height, and wherein the fin chord length is at least two times that of the fin height.

6. The gas turbine engine of claim 3, wherein the fin and the manifold each include an axially straight section and a cambered section.

7. The gas turbine engine of claim 4, wherein the sheet includes a passage assembly.

8. The gas turbine engine of claim 7, wherein the first manifold and the second manifold of the manifold assembly each include a respective channel assembly, and wherein the passage assembly is fluidly coupled with the respective channel assembly.

9. The gas turbine engine of claim 8, wherein the heat exchanger assembly defines a segment between the first manifold and the second manifold, wherein the heat exchanger assembly includes a set of fins extending circumferentially between the first manifold and the second manifold, and wherein the first manifold, the second manifold, and the set of fins are coupled to the sheet.

10. The gas turbine engine of claim 8, wherein the heat exchanger assembly further comprises:

a third manifold positioned between the first manifold and the second manifold;

a first set of fins extending circumferentially between the first manifold and the third manifold; and a second set of fins extending circumferentially between the third manifold and the second manifold.

11. A gas turbine engine defining a radial direction and an axial direction, the gas turbine engine comprising:

an inlet duct comprising a splitter;

a fan duct downstream from the inlet duct and the splitter;

a core duct downstream of the inlet duct and the splitter, the core duct being radially inward of the fan duct; and a heat exchanger assembly extending annularly about at least one of the inlet duct, the fan duct, or the core duct, the heat exchanger assembly comprising:

a sheet extending circumferentially about the at least one of the inlet duct, the fan duct, and the core duct; and one or more aerodynamic features extending from the sheet, the one or more aerodynamic features within the at least one of the inlet duct, the fan duct, and the core duct, wherein the one or more aerodynamic features includes a fin defining a fin thickness and a fin chord length, the one or more aerodynamic features further including a manifold defining a manifold thickness and a manifold chord length, wherein the fin and the manifold each include an axially straight section and a cambered section.

* * * * *